Patented June 20, 1944

2,351,735

UNITED STATES PATENT OFFICE 2,351,735

QUICK CURING NEOPRENE CEMENT

Louis S. Bake, Penns Grove, N. J., assignor to E. I. du Pont de Nemours & Company, Wilmington, Del., a corporation of Delaware No Drawing. Application August 12, 1941, Serial No. 406,536

10 Claims. (Cl. 260—32)

This invention relates to the curing of neoprene. More specifically, the invention relates to accelerating the curing of neoprene and lowering the temperature of curing by means of litharge and a butyraldehydeamine.

It is known that certain compounds, including litharge and butyraldehydeamines, used separately, mildly accelerate the curing of neoprene (a rubber-like material made by polymerizing 2-chloro-1,3-butadiene in the presence or absence of modifiers). However, it has not previously been known to cure neoprene with sufficient speed at relatively low temperatures to make this material suitable for use in a floor or deck covering composition, in coating compositions and other places where rapid curing in the absence of high temperatures is essential or desirable.

It is an object of this invention to treat a neoprene composition so that it can be more rapidly cured than has hitherto been possible. Another object is to accelerate curing of neoprene compositions at relatively low curing temparatures. A further object is to provide a quick low temperature curing neoprene composition. A still further object is a neoprene composition which is stable in storage and yet has quick low temperature curing. Other objects will appear hereinafter.

These objects have been accomplished by the discovery that the accelerating effect of litharge and butyraldehydeamines, especially butyraldehyde-monobutylamine, used together, is far greater than the effect of the two used separately would indicate. It has further been discovered that the addition of a small amount of an alcohol or a ketone to a neoprene composition containing both litharge and an aldehydeamine preserves the composition without materially delaying curing under conditions of use.

This invention is applicable only to neoprene of a type having sulfur in chemical combination with the polychloroprene, made by polymerizing chloroprene (2-chloro-1,3-butadiene) in the presence of elementary sulfur. The sulfur may amount to as much as is soluble in the chloroprene; i. e., up to about 2 per cent of the weight of the chloroprene. This material is hereinafter referred to as sulfur-neoprene. The polymerization is preferably carried out in emulsion. Emulsifying agents, antioxidants, agents for controlling polymerization rate, etc., may be used all as known in the prior art. Although not preferred, massive or solution polymerization may be used.

In order that the process of preparing the polymeric materials suitable for the present invention may be more fully understood, the following processes are set forth in detail by way of illustration, but it is to be understood that the process is not limited to such illustration.

PROCESS A

One and five-tenths (1.5) parts of sulfur was dissolved in 100 parts of chloroprene by first dissolving the sulfur in 3 parts of a chlorinated naphthalene, having a melting point of 90° C. to 95° C., at 125° C. and stirring this hot solution into the chloroprene in which 4 parts of wood rosin had already been dissolved at 40° C. This solution was then emulsified in 233 parts of water containing 0.5 part of ammonium persulfate, 0.5 part of the sodium salts of the dinaphthylmethane sulfonic acids prepared according to U. S. Patent No. 1,191,485 and 0.8 part of sodium hydroxide. The resulting dispersion was then maintained at 40° C., by cooling and heating as necessary, until the density reached 1.050. At this point, the dispersion was treated with 1 part of phenyl-beta-naphthylamine dispersed in sodium abietate solution, neutralized with acetic acid, and coagulated in the form of a continuous sheet as described in the U. S. Patent No. 2,187,146 to Calcott and Starkweather, by freezing it in a thin layer on the surface of a rotating, internally cooled drum, allowing the thin layer to remain in contact with the freezing surface for a length of time such that, on removing the film from the drum and allowing the ice therein to melt, a continuous sheet of completely coagulated material remained. The sheet was then washed by passing it under sprays of water while supported on a moving belt and dried by passage through a chamber through which air heated to 80° C. was passing. Four per cent (4%) of tetramethyl thiuram disulfide was then incorporated into the dry polymer by milling and the product was then ready for storage, shipment, or use.

PROCESS B

A polymer was prepared according to the process of Process A except that 2 per cent of sulfur was used.

In order to practice the present invention, the neoprene is compounded and cured as described hereinafter. By way of illustration, the following examples, wherein "parts" mean parts by weight, are given, but the invention is not limited thereto as will appear more fully hereinafter.

Example I

A base cement was made by mixing together the following:

| Base cement: | Parts |
|---|---|
| Sulfur-neoprene made according to Process A | 100 |
| Hexamethylene-ammonium-hexamethylene-dithiocarbamate | 1 |
| Phenyl-beta-naphthylamine | 2 |
| Soft carbon black | 100 |
| Mineral oil | 10 |

Solvent to make a 55 per cent solution of the above. Into this base cement, there was worked 20 parts of litharge and 2 parts of butyraldehyde-monobutylamine. This composition gelled in 3 hours. (Time of gelation is a measure of curing acceleration.) For purposes of comparison, similar compositions were made with one of the accelerators and without any accelerator. The results are shown in the following table.

Table

| Parts of sulfur-neoprene in base cement | 100 | 100 | 100 | 100 |
|---|---|---|---|---|
| Parts of litharge | | 20 | | 20 |
| Parts of butyraldehyde-monobutylamine | | | 2 | 2 |
| Gelling time hours | (1) | 24 | 18 | 3 |

[1] More than six months.

As will be seen from the table, the composition containing both litharge and the aldehydeamine gells in a small fraction of the time required for either accelerator alone.

Example II

To 100 parts of the base cement disclosed in Example I was added 5 parts of a slurry of the following composition:

| Slurry: | Parts |
|---|---|
| Litharge | 100 |
| Butyraldehyde-monobutylamine | 25 |
| Xylene | 125 |

The resulting composition gelled in approximately 2 hours. A portion of the composition held at 30° C. became cured in about 2 weeks and a second portion held at 70° C. cured in approximately 24 hours.

Example III

A composition of trowelling consistency was made by mixing the following:

| Base composition: | Parts |
|---|---|
| Sulfur-neoprene made according to Process A | 100 |
| Diortho-tolyl-guanidine | 4 |
| Phenyl-beta-naphthylamine | 2 |
| Semi-reinforcing carbon black | 75 |
| Mineral oil | 10 |
| Xylene | 30 |

An accelerator mixture is made of:

| | Parts |
|---|---|
| Litharge | 100 |
| Butyraldehyde-monobutylamine | 25 |

To 100 parts of the base composition, there was added 5 parts of the accelerator mixture. The resulting composition had approximately the same stability and curing properties as that of Example II.

Example IV

A heavy compounded neoprene stock which can be sheeted out was made by compounding.

| Neoprene stock: | Parts |
|---|---|
| Sulfur-neoprene made as in Process A | 100 |
| Phenyl-beta-naphthylamine | 2 |
| Extra light calcined magnesia | 10 |
| Blanc fixe | 75 |
| Channel black | 10 |
| Zinc oxide | 15 |
| Paraffin | 1 |
| Litharge | 2.5 |
| Butyraldehyde-monobutylamine | .75 |

This stock may be sheeted out from a rubber mill or calender. It will become cured at room temperature of 30° C. in approximately 3 weeks. If the litharge is increased from 2.5 to 5 parts and the butyraldehyde-monobutylamine is increased from .75 to 1.5 parts in the above stock, the stock will cure up on the mill at ordinary commercial mill temperatures.

While butyraldehyde-monobutylamine is the most active, and, hence, the preferred butyraldehyde amine, other butyraldehyde amines may be substituted therefor, such, for example, as butyraldehyde-aniline. However, the combination of litharge and butyraldehyde-monobutyl amine is by far the most active one found.

The mixture of litharge and butyraldehyde amine is a distinct improvement over either used alone regardless of proportions of the mixture, it being understood that material amounts of each ingredient must be present. For example, as little as 2 per cent of either ingredient in the mixture will have a decided effect. Preferably, however, the accelerator consists of from about 10–20 parts of litharge to 2 parts of butyraldehyde. The mixed accelerator may be used in amounts varying, in general, from 0.5 to 25 parts of accelerator to 100 parts of sulfur-neoprene. For cements and putties, approximately from 10–25 parts of accelerator to 100 parts of neoprene are suitable. For sheeted out stock, approximately from 0.5 to 10 parts of accelerator to 100 parts of neoprene may be used.

As has been disclosed above, the accelerator not only shortens the curing time and temperature, but also brings about gelation in a short time. Once gelation has occurred, the use of the composition for coating is impaired or prevented. It has been found that the addition of a small amount of an alcohol or ketone, volatile at the curing temperature, for example, methyl, ethyl and amyl alcohols, acetone, etc., prevent gelation. The amount of alcohol is not critical, but, in general, a few per cent of alcohol is sufficient. When the composition is used as a coating, adhesive, or impregnating composition, the alcohol or ketone evaporators and the curing occurs as though the alcohol or ketone had never been present. Ethyl alcohol is preferred. Alcohols and ketones having not more than 5 carbon atoms are especially suitable for the purpose. Mixtures of alcohols, mixtures of ketones, or mixtures of one or more alcohols with one or more ketones can be used. In fact, under some circumstances, it may be advantageous to have both an alcohol and a ketone present, as, for example, ethyl alcohol and acetone.

Conventional compounding ingredients for rubber and rubber-like materials may be present in the composition; also fillers, pigments, etc., such as are found in coating, caulking, and molding compositions.

The consistency of the composition may be varied by the use of greater or lesser amounts of solvent. In general, cements range from about 10 per cent to about 65 per cent sulfur-neoprene and putties range from about 65 per cent to about 85 per cent sulfur-neoprene. Any inert volatile organic solvent may be used, such, for example, as benzene, toluene, xylene, carbon tetrachloride, trichloromethane, etc. The solvent of Example I was a mixture of xylene and "Solveso No. 1" (a hydrogenated cracked petroleum hydrocarbon fraction with a boiling point range approximate to that of toluene, and which is used as a substitute for toluene).

Depending upon the consistency and compounding ingredients, the neoprene compositions have many uses. Thus, the composition of Example II is suitable for adhesives for wood, metal, fabrics, etc., the coating of equipment for chemical processing or storage to prevent corrosion, the impregnation of fabrics, wood, cork, and other porous materials, and the coating of rubber articles to inhibit oxidation and sun checking or oil absorption; the composition of Example III may be used for the laying of floors, or deck covering, the caulking of expansion joints in floors, swimming pools, skylights, etc., self-vulcanizing shoe repairing compounds, and patching of damaged spots on equipment previously coated with rubber or rubber-like materials; the composition of Example IV may be used as a material for covering floors, decks, stairs, etc.

The cements made according to the present invention not only have the advantage of quick curing at low temperatures, but also have improved body. Thus, 2 or 3 coats of these cements give good bonds where a much larger number of coats of other cements are frequently necessary. The following examples where "parts" means "parts by weight" illustrate this feature.

EXAMPLE A
Adhesion of lead to resin

The surface of a metallic lead panel was roughened with sand paper and given 2 coats of a priming cement having the following composition:

| Part A: | Parts by weight |
|---|---|
| Neoprene | 5,000 |
| Phenyl-beta-naphthylamine | 100 |
| Extra light calcium magnesia | 500 |
| Wood rosin | 250 |
| Cotton seed oil | 250 |
| Semi-reinforcing carbon black | 2,500 |
| Sulfur | 50 |
| Zinc oxide | 500 |
| Toluene | 36,550 |

| Part B: | |
|---|---|
| Toluene | 55 |
| Chlorinated rubber | 14 |

Fourteen (14) parts of Part A are mixed with 69 parts of Part B.

This priming cement coating was followed by 3 coats of the cement described in Example I.

After drying for 24 hours at room temperature, the coating was vulcanized at 70° C. for an additional 24 hours. To this cured film was cemented a layer of a synthetic phenol-formaldehyde resin ("Carbo Korez") which, in turn, was allowed to cure. The pull necessary to break the neoprene-"Carbo Korez" bond was 250 pounds per square inch.

EXAMPLE B
Adhesion of lead to steel

The lead and steel surfaces were sand blasted and given 2 coats of the priming cement described in Example A, followed by 3 coats of neoprene cement described in Example I. After drying for 2 hours at room temperature, the painted surfaces were rolled together and the assembled test piece heated in the 70° C. oven for 24 hours to vulcanize the neoprene coating. A pull of 240 pounds per square inch was required to rupture the bond.

EXAMPLE C
Adhesion of cured neoprene to itself

Two (2) strips of cured neoprene composition (6" x 1") were adhered together as follows:

The neoprene surface was roughened with sand paper and given 1 coat each of the accelerated neoprene cement described in Example I. After drying for 2 hours, the strips were rolled together and heated for 18 hours at 70° C. A pull of 20 pounds per linear inch was required to strip the films.

EXAMPLE D
Adhesion of cured rubber to itself

Rubber test pieces were prepared and the films adhered as above in Example C. A pull of 22 pounds per linear inch was required to separate the film.

EXAMPLE E
Adhesion of cured neoprene to cured rubber

Test pieces were prepared and the films adhered as in Example C. A pull of 20 pounds was required to strip the films.

EXAMPLE F
Adhesion of cured neoprene and cured rubber to steel

The metal was sand blasted and given 1 coat of the previously described priming cement followed by 1 coat of the neoprene cement of Example I. The neoprene and rubber was roughened and given 1 coat of neoprene cement of Example I. After drying for 2 hours at room temperature, the films were rolled into intimate contact with the cement on the metal and heated for 18 hours at 70° C.

The following pulls per linear inch was required to strip the films from the metal.

| | Pounds |
|---|---|
| A. Neoprene | 20 |
| B. Rubber | 23 |

It is apparent that many widely different embodiments of this invention may be made without departing from the spirit and scope thereof, and, therefore, it is not intended to be limited except as indicated in the appended claims.

I claim:

1. A curable neoprene composition comprising a mixture of an uncured chloroprene polymer obtained by polymerizing chloroprene in the presence of an amount of elementary sulfur up to 2% of the weight of the chloroprene, and an accelerator comprising litharge and a butyraldehydeamine.

2. A curable neoprene composition comprising a mixture of an uncured chloroprene polymer obtained by polymerizing chloroprene in the presence of an amount of elementary sulfur up to 2% of the weight of the chloroprene, an accelerator comprising litharge and a butyraldehyde-amine, and a solvent.

3. A curable neoprene composition comprising a mixture of an uncured chloroprene polymer obtained by polymerizing chloroprene in the presence of an amount of elementary sulfur up to 2% of the weight of the chloroprene, an accelerator comprising litharge and a butyraldehyde-amine, a volatile liquid compound of the class consisting of alcohols and ketones containing less than six carbon atoms, and a solvent.

4. A curable neoprene composition comprising a mixture of an uncured chloroprene polymer obtained by polymerizing chloroprene in the presence of an amount of elementary sulfur up to 2% of the weight of the chloroprene, an accelerator comprising litharge and a butyraldehyde-amine, a volatile liquid alcohol containing less than six carbon atoms, and a solvent.

5. A curable neoprene composition comprising a mixture of an uncured chloroprene polymer obtained by polymerizing chloroprene in the presence of an amount of elementary sulfur up to 2% of the weight of the chloroprene, an accelerator containing litharge and a butyraldehyde-amine, ethyl alcohol, and a solvent.

6. A curable neoprene composition comprising a mixture of an uncured chloroprene polymer obtained by polymerizing chloroprene in the presence of an amount of elementary sulfur up to 2% of the weight of the chloroprene, from 0.5 to 25 parts, based on 100 parts of chloroprene polymer, of accelerator consisting of litharge and butyraldehyde-mono-butylamine, and a solvent.

7. A curable neoprene composition comprising a mixture of 100 parts of an uncured chloroprene polymer obtained by polymerizing chloroprene in the presence of an amount of elementary sulfur up to 2% of the weight of the chloroprene, from 10 to 25 parts of an accelerator consisting of a mixture of litharge and butyraldehyde-monobutylamine, the proportions of the mixture being about 10 to 20 parts of litharge to 2 parts of butyraldehyde-monobutylamine and a solvent in amounts such as to produce a composition having from about 10 per cent to about 65 per cent sulfur-neoprene.

8. A curable neoprene composition comprising a mixture of 100 parts of an uncured chloroprene polymer obtained by polymerizing chloroprene in the presence of an amount of elementary sulfur up to 2% of the weight of the chloroprene, from 10 to 25 parts of an accelerator consisting of a mixture of litharge and butyraldehyde-monobutylamine, the proportions of the mixture being about 10 to 20 parts of litharge to 2 parts of butyraldehyde-monobutylamine and a solvent in amounts such as to produce a composition having from about 65 per cent to about 85 per cent sulfur-neoprene.

9. A curable neoprene composition comprising an uncured chloroprene polymer obtained by polymerizing chloroprene in the presence of an amount of elementary sulfur up to 2% of the weight of the chloroprene:

| | Parts |
|---|---|
| Sulfur-neoprene | 100 |
| Hexamethylene-ammonium-hexamethylene-dithiocarbonate | 1 |
| Phenyl-beta-naphthylamine | 2 |
| Soft carbon black | 100 |
| Mineral oil | 10 |

Solvent to make 55 per cent solution of the above, 20 parts of litharge and 2 parts of butyraldehyde-monobutylamine.

10. A curable neoprene composition consisting of 100 parts of a base composition of the following:

A chloroprene polymer obtained by polymerizing chloroprene in the presence of an amount of elementary sulfur up to 2% of the weight of the chloroprene.

| | Parts |
|---|---|
| Sulfur-neoprene | 100 |
| Diortho-tolyl-guanidine | 4 |
| Phenyl-beta-naphthylamine | 2 |
| Semi-reinforcing carbon black | 75 |
| Mineral oil | 10 |
| Xylene | 30 | and 5 parts of an accelerator mixture having the following composition:

| | Parts |
|---|---|
| Litharge | 100 |
| Butyraldehyde-monobutylamine | 25 |

LOUIS S. BAKE.